(12) United States Patent
Brown (10) Patent No.: US 7,497,448 B2
(45) Date of Patent: Mar. 3, 2009

(54) TUGGER CART WITH TILTABLE PLATFORM

(76) Inventor: Edmund W. Brown, 8715 Gittings Rd., Racine, WI (US) 53406

( * ) Notice: Subject to any disclaimer, the term of this patent is extended or adjusted under 35 U.S.C. 154(b) by 273 days.

(21) Appl. No.: 11/223,578

(22) Filed: Sep. 9, 2005

(65) Prior Publication Data

US 2007/0057477 A1 Mar. 15, 2007

(51) Int. Cl.
  *B62B 3/08* (2006.01)
(52) U.S. Cl. .................. 280/47.34; 280/79.11; 280/656
(58) Field of Classification Search ............. 280/47.34, 280/79.2–3, 79.11, 47.371, 656, 79.3; 414/339, 414/346, 350, 482
  See application file for complete search history.

(56) References Cited

U.S. PATENT DOCUMENTS

| 731,707 | A | | 6/1903 | Putnam |
|---|---|---|---|---|
| 1,462,921 | A | | 7/1923 | Reichmann |
| 1,744,972 | A | | 1/1930 | Kline |
| 1,860,973 | A | | 5/1932 | Yeakel |
| 1,938,407 | A | | 12/1933 | Thomas et al. |
| D120,752 | S | | 5/1940 | Gallinger |
| 2,414,404 | A | | 1/1947 | Youther |
| 2,711,679 | A | | 6/1955 | Kuhary |
| 2,759,702 | A | | 8/1956 | Abraham |
| 2,765,054 | A | * | 10/1956 | Rossman .................. 188/284 |
| 3,112,042 | A | | 11/1963 | Leshner |
| 3,117,773 | A | | 1/1964 | Wallens et al. |
| 3,142,363 | A | | 7/1964 | Tamini |
| 3,208,768 | A | | 9/1965 | Hulbert |
| 3,403,799 | A | | 10/1968 | Sindzinski et al. |
| D213,044 | S | | 12/1968 | Brown et al. |
| 3,561,622 | A | | 2/1971 | Dioguardi |
| 3,623,617 | A | | 11/1971 | Nemessanyi |
| 3,689,106 | A | * | 9/1972 | Young .......................... 410/1 |
| 3,848,726 | A | | 11/1974 | Wiemer |
| 4,191,280 | A | | 3/1980 | Copperwheat |
| 4,279,431 | A | | 7/1981 | Schott |
| 4,317,524 | A | * | 3/1982 | Andersson .................. 212/272 |
| 4,333,250 | A | | 6/1982 | Henderson |
| 4,451,066 | A | | 5/1984 | Collins |
| 4,456,291 | A | | 6/1984 | Brogie |

(Continued)

FOREIGN PATENT DOCUMENTS

GB 1257827 9/1969

OTHER PUBLICATIONS

"Story about Ergo-Tilt-Veyor"—paragraphs 9 and 14—www.toperindustrial.com/sub/story2.html—available to the public on or before Dec. 25, 2002.*

(Continued)

*Primary Examiner*—Christopher P Ellis
*Assistant Examiner*—Vaughn T Coolman
(74) *Attorney, Agent, or Firm*—Boyle Fredrickson, S.C.

(57) ABSTRACT

A tugger cart is provided for transporting a load about a factory or the like. The tugger cart includes a support frame and a wheel assembly operatively connected to the support frame for supporting the support frame above a supporting surface. A bed pivotably mounted to the support frame for receiving the load thereon. The bed is movable between a first position wherein the bed lies in a generally horizontal plane and a second position wherein the bed is at a predetermined angle to the horizontal plane.

13 Claims, 4 Drawing Sheets

U.S. PATENT DOCUMENTS

| | | | |
|---|---|---|---|
| 4,505,495 | A | 3/1985 | Foss et al. |
| 4,585,259 | A | 4/1986 | Vidas |
| 4,589,669 | A | 5/1986 | Kedem |
| 4,595,330 | A | 6/1986 | O'Brien et al. |
| 4,637,626 | A | 1/1987 | Foss et al. |
| 4,909,697 | A * | 3/1990 | Bernard et al. ......... 414/331.04 |
| 5,161,653 | A | 11/1992 | Hare, Sr. |
| 5,328,192 | A | 7/1994 | Thompson |
| 5,350,077 | A | 9/1994 | Nezu et al. |
| 5,425,560 | A | 6/1995 | Andersen et al. |
| 5,476,180 | A | 12/1995 | Konstant |
| 5,513,936 | A | 5/1996 | Dean |
| 5,558,359 | A | 9/1996 | Phears |
| 5,605,427 | A | 2/1997 | Hammond |
| 5,617,961 | A | 4/1997 | Konstant et al. |
| 5,624,137 | A | 4/1997 | Lesesne |
| 5,662,046 | A | 9/1997 | Wright et al. |
| 5,692,593 | A | 12/1997 | Ueno et al. |
| 5,727,669 | A | 3/1998 | Rich, Jr. |
| 5,779,252 | A | 7/1998 | Bolton, Jr. |
| D396,925 | S | 8/1998 | Kessler et al. |
| 6,257,358 | B1 * | 7/2001 | Roach ...................... 180/19.1 |
| 6,375,202 | B2 | 4/2002 | Weck et al. |
| 6,390,278 | B1 * | 5/2002 | Brown ................... 198/463.3 |
| 6,394,481 | B1 | 5/2002 | Pinlam et al. |
| 6,467,501 | B1 * | 10/2002 | Geile et al. ................. 137/501 |
| D473,989 | S | 4/2003 | Hittle |
| D473,990 | S | 4/2003 | Hittle |
| 6,582,024 | B2 | 6/2003 | Hicks |
| 6,619,687 | B2 | 9/2003 | Goby |
| 6,659,565 | B2 | 12/2003 | Brant |
| 6,685,200 | B1 | 2/2004 | Giannoni et al. |
| 6,736,245 | B2 | 5/2004 | Brown |
| 6,832,628 | B2 * | 12/2004 | Thordarson et al. ......... 137/613 |
| 6,877,764 | B2 | 4/2005 | Sagol |
| 2005/0206106 | A1 * | 9/2005 | Labadie et al. ........... 280/79.11 |

OTHER PUBLICATIONS

"Cart of the Month—May"—photo and text—www.topperindustrial.com/sub/octobertop.html and www.topperindustrial.com/sub/octoberbottom.html—available to the public on or before Jan. 28, 2004.*

"Tilt Cart uses foot pedal for tilting"—ThomasNet article—http://news.thomasnet.com/fullstory/450594—dated Apr. 12, 2004 (released to ThomasNet on Mar. 26, 2004).*

"Ergonomic Cart handles tall containers"—ThomasNet article—http://news.thomasnet.com/fullstory/29722/1450—dated Jan. 14, 2004 (released to ThomasNet on Jan. 13, 2004).*

"Parts Carts"—article on Topper Industrial versatile tilt cart—http://www.contentconvergence.com/dcvelocity/january2003/rollouts.htm—available to public on or around Jan. 2003.*

Topper Industrial website—various pages—www.topperindustrial.com/index.html and www.topperindustrial.com/sub/carts.html—available to public on or before Jun. 13, 2004 as evidenced by www.archive.org—wayback machine.*

* cited by examiner

TUGGER CART WITH TILTABLE PLATFORM

FIELD OF THE INVENTION

This invention relates generally to wheeled carts, and in particular, to a tugger cart having a tiltable support platform for transporting materials received thereon about a factory or the like and for depositing the materials at a user selected workstation.

BACKGROUND AND SUMMARY OF THE INVENTION

In order to transport pallets, containers and materials throughout a factory, wheeled tugger carts are often used. These tugger carts allow an individual to deliver the pallets, containers and materials to the desired workstation in the factory. It can be appreciated that after the containers are transported to the desired locales in the factory, these containers must be unloaded or removed from the support platform of the tugger cart. However, given the significant weight of a loaded container, it may difficult for a worker to remove the container from or to unload the container positioned on the support platform of the tugger cart. Hence, it is highly desirable to provide a tugger cart that allows for a worker to simply and easily remove a loaded container from or unload the container positioned on the support platform of the tugger cart.

It can be further appreciated that unloading the pallets, containers or materials positioned on the elevated support platforms of corresponding tugger carts is often difficult and time consuming. For example, a container may have to be reorientated on the support platform in order to allow for access to the interior thereof by a worker. When the pallets, containers or materials transported on a tugger cart are of significant size and/or weight, it may be difficult for a user to reorientate the pallet, container or material delivered to the workstation. Consequently, it is highly desirable to provide a tugger cart which allows for a user to easily orientate the pallets, containers, or materials transported thereon to allow access to the interior thereof by a worker.

Therefore, it is a primary object and feature of the present invention to provide a tugger cart for transporting pallets, containers and materials throughout a factory that is simple to use and inexpensive to manufacture.

It is a still further object and feature of the present invention to provide a tugger cart for transporting pallets, containers and materials throughout a factory that allows for a user to reorientate the pallets, containers and materials supported thereon to facilitate access to the interior thereof by a worker.

It is a still further object and feature of the present invention to provide a tugger cart for transporting pallets, containers, and materials throughout a factory that is simple to use and inexpensive to manufacture.

In accordance with the present invention, a tugger cart is provided for transporting a load having a weight. The tugger cart a support frame and a bed pivotably mounted to the support frame for receiving the load thereon. The bed is movable between a first position wherein the bed is lies in a generally horizontal plane and a second position wherein the bed is a predetermined acute angle to the horizontal plane. A wheel assembly is operatively connected to the support frame for supporting the support frame above a supporting surface.

The tugger cart also includes a bed locking structure for locking the bed in the first position. The bed locking structure has a retractable pin operatively connected to one of the bed and the support frame that movable between along a pin axis between an extended position and a retracted position. A sleeve is connected to the other of the bed and the support frame. The sleeve defines a recess for receiving the pin in the extended position. An actuator is operatively connected to the pin for moving the pin between the extended and retracted positions.

It is intended that the bed of the tugger cart pivot from the first position to the second position at a predetermined rate independent of the weight of the load. The tugger cart includes a cylinder assembly operatively connecting the bed to the support frame for controlling the predetermined rate. The cylinder assembly includes a cylindrical housing having first and second ends and an inner surface defining a cavity in the housing for receiving a fluid therein. The cylinder housing is operatively connected to one of the bed and the support frame. A piston slidably extends through the cavity in the housing. The piston has a first end connected to the other of the bed and the support frame and a second end. A flange projects from the piston and is positioned within the cavity so as to divide the cavity in the housing into first and second portions. The flange terminates at a radially outer edge that forms a slidable interface with the inner surface of the housing. A differential pressure valve has an upstream input communicating with the first portion of the cavity and a downstream output communicating with the second portion of the cavity. The flow rate of the fluid at the output of the differential pressure valve is constant in response to various pressures of the fluid at the input. The cylinder assembly may also include a check valve for controlling the flow of fluid from the second portion to the first portion of the cavity.

In accordance with a further aspect of the present invention, a tugger cart is provided from transporting a load. The tugger cart includes a support frame and a bed pivotably mounted to the support frame for receiving the load thereon. The bed is movable at a predetermined rate from a generally horizontal position to a tilted position wherein the bed is at a predetermined angle to horizontal. A differential pressure valve controls the predetermined rate.

The tugger cart also includes a wheel assembly operatively connected to the support frame for supporting the support frame above a supporting surface and a handle assembly extending from the support frame. A locking structure is operatively connected to the bed for locking the bed in the horizontal position. The locking structure includes a retractable pin operatively connected to the bed. The pin is movable between along a pin axis between an extended position wherein the pin is receivable in an opening in the support frame and a retracted position. An actuator is operatively connected to the pin for moving the pin between the extended and retracted positions.

The tugger cart may also include a cylinder assembly having a cylindrical housing with first and second ends and an inner surface defining a cavity in the housing for receiving a fluid therein. The cylinder housing is operatively connected one of the bed and the support frame. A piston slidably extends through the cavity in the housing. The piston has a first end connected to the other of the bed and the support frame and a second end. A flange projects from the piston and is positioned within the cavity so as to divide the cavity in the housing into first and second portions. The flange terminates at a radially outer edge that forms a slidable interface with the inner surface of the housing.

The differential pressure valve has an upstream input communicating with the first portion of the cavity and a downstream output communicating with the second portion of the cavity. The flow rate of the fluid at the output of the differential pressure valve is constant in response to various pressures of the fluid at the input. A check valve controls the flow of fluid from the second portion to the first portion of the cavity.

In accordance with a still further aspect of the present invention, a tugger cart is provided for transporting a load. The tugger cart includes a support frame and a bed pivotally mounted to the support frame for receiving the load thereon. The bed is movable between a generally horizontal position and a tilted position wherein the bed is at a predetermined angle to horizontal. Control structure is provided for controlling the rate at which the bed pivots from the horizontal position and the tilted position.

A locking structure operatively is connected to the bed for locking the bed in the horizontal position and a connection assembly operatively is connected to the support frame for interconnecting the tugger cart to a second tugger cart. The control structure includes a cylindrical housing having first and second ends and an inner surface defining a cavity in the housing for receiving a fluid therein. The cylinder housing is operatively connected one of the bed and the support frame. A piston slidably extends through the cavity in the housing. The piston has a first end connected to the other of the bed and the support frame and a second end. A flange projects from the piston and is positioned within the cavity so as to divide the cavity in the housing into first and second portions. The flange terminates at a radially outer edge that forms a slidable interface with the inner surface of the housing.

The control structure includes a differential pressure valve having an input communicating with the first portion of the cavity and an output communicating with the second portion of the cavity. The flow rate of the fluid at the output of the differential pressure valve is constant in response to various pressures of the fluid at the input.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Referring to FIGS. 1-4, a tugger cart in accordance with the present invention is generally designated by the reference numeral 10. Tugger cart 10 includes support frame 12 defined by first and second generally parallel side frame members 14 and 16, respectively, interconnected by leading and trailing frame members 20 and 22, respectively. Support frame 12 further includes intermediate frame member 24 extending between leading and trailing frame members 20 and 22, respectively. Intermediate frame member 24 is generally parallel to and spaced between side frame members 14 and 16, respectively.

Support frame 12 also includes first and second vertical frame members 25 and 26, respectively, extending vertically from corresponding side frame members 14 and 16, respectively. Mounting brackets 33 and 35 are interconnected to the upper, terminal ends of corresponding vertical frame members 25 and 26, respectively, for reasons hereinafter described. Upper cross support 17 extends between the upper ends of vertical frame members 25 and 26. Shock absorber 19 is mounted to upper surface 17a of platform cross support 17, for reasons hereinafter described. First platform support 27 extends between the upper end of vertical frame member 25 and the trailing end of side frame member 14 at a predetermined angle to side frame member 14. Similarly, second platform support 28 extends between the upper end of vertical frame member 26 and the trailing end of side frame member 16 at a predetermined angle to side frame member 16. It is intended for first and second platform supports 27 and 28, respectively, to be generally parallel to each other. Platform cross support 29 extends between platform supports 27 and 29 so as to add strength and stability to support frame 12. Shock absorber 31 is mounted to upper surface 29a of platform cross support 29, for reasons hereinafter described.

Support frame 12 of tugger cart 10 is supported above supporting surface 30 such as a factory floor or the like by a plurality of caster assemblies 32. Each caster assembly 32 includes mounting plate 34 having upper and lower surfaces. U-shaped brackets 36 depend from the lower surfaces of mounting plates 34 of caster assemblies 32. Axles 38 extend between the legs of U-shaped brackets 36 to rotatably support corresponding caster wheels 40 thereon. It is contemplated to mount each caster assembly 32 to support frame 12 about the periphery thereof. By way of example, caster assemblies 32 may be positioned at the leading and trailing ends of first and second side frame member 14 and 16, respectively.

In addition, enlarged caster assemblies 42 may be interconnected to side frame members 14 and 16 of support frame 12 at locations equidistant from leading frame member 20 and trailing frame member 22. Caster assemblies 42 include mounting plates 44 having legs depending therefrom. Axles 46 extend between the legs of caster assemblies 42 to rotatably support caster wheels 48 thereon. Caster wheels 48 of caster assemblies 42 have larger diameters than the diameters of caster wheels 40 of caster assemblies 32 in order to provide additional support for bed assembly 50, hereinafter described.

Bed assembly 50 includes platform 51 having a generally flat upper surface 52 and a generally flat lower surface 54. Platform 51 further includes side supports 56 and 58, as well as, first and second end supports 60 and 62, respectively, about the outer periphery thereof. Side supports 56 and 58 are pivotably connected to corresponding mounting brackets 33 and 35, respectively, by pivot pins 61 and 63, respectively. As hereinafter described, platform 51 is pivotably on pivot pins 61 and 63 between a first, generally horizontal position, FIGS. 1-2, and a second, tilted position, FIGS. 3-4, wherein platform 51 is at a predetermined, and preferably acute, angle to a horizontal plane in which platform 51 lies when in its horizontal position.

Generally V-shaped retaining elements 66a-d project from corresponding corners 64a-d of platform 51 at an angle generally perpendicular to upper surface 52 of platform 51. Retaining elements 66a and 66b are interconnected by side support 67 that is spaced from upper surface 52 of platform 51. Similarly, retaining elements 66c and 66d are interconnected by side support 69 that is spaced from upper surface 52 of platform 51. End support 71 is spaced from upper surface 52 of platform 51 and interconnects retaining elements 66b and 66d. It can be appreciated that retaining elements 66a-d, side supports 67 and 69, and end support 71 are intended to maintain a load on upper surface 52 of platform 51.

Handle 68 projects laterally from retaining elements 66b and 66b. Handle 68 includes first and second side portions 72 and 74, respectively, that project from corresponding retaining elements 66b and 66d, respectively. First and second side portions 72 and 74, respectively, of handle 68 are interconnected by grasping portion 76. Actuator 77 is pivotably mounted to handle 68 and is movable between a first locking position, FIG. 2, and a release position, for reasons hereinafter described. Actuator 77 includes pivotable rod 78 having a first end pivotably mounted to first side portion 72 of handle 68 and a second end pivotably mounted to second side portion 74 of handle 68. Actuator 77 further includes grasping bar 79 generally parallel to and interconnected to rod 78 by segments 81a and 81b.

Figure 7:
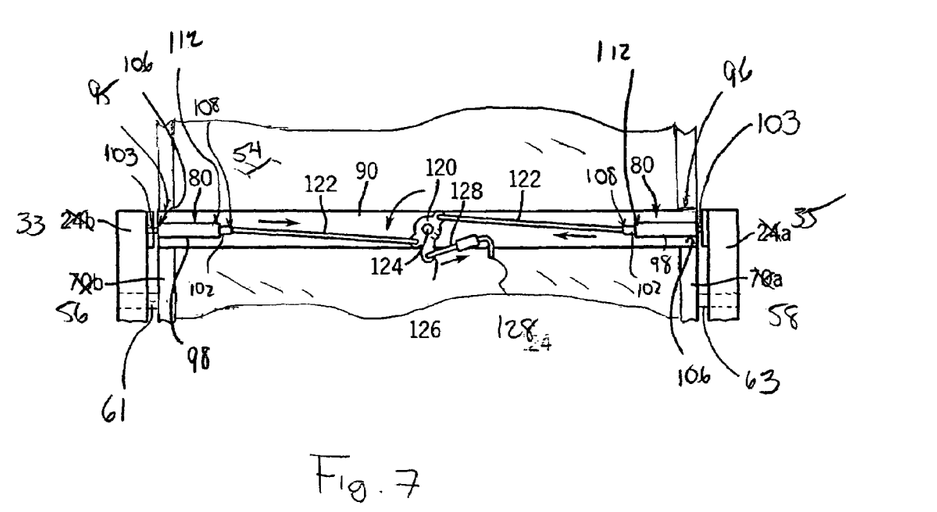
FIG. 7 is a bottom elevational view showing a portion of the tugger cart of the present invention.

Referring to FIG. 7, actuator 77 is operatively connected to connection bracket 120 by push-pull cable 128. Connection bracket 120 is pivotably mounted by pivot pin 124 to lower surface 94 of cross beam 90 that extends along lower surface 54 of platform 51 between side supports 56 and 58. Pin structures 80 are also mounted onto lower surface 94 at opposite ends 95 and 96 of cross beam 90 adjacent corresponding mounting brackets 33 and 35, respectively. Each pin structure 80 includes a pin housing 98 having an inner surface defining a generally cylindrical chamber therein. Pin member 102 is slidably received within the chamber in pin housing 98. Pin member 102 includes first end 103 which projects through a corresponding opening in a first end 106 of pin housing 98 and second opposite end 108 which projects through an opening in a second opposite end 112 of pin housing 98. A flange projects radially from pin member 102 and includes a radially outer surface which engages the inner surface of pin housing 98 and forms a slidable interface therewith. A spring is disposed within the chamber within pin housing 98 so as to engage the flange and urge the flange away from second end 112 of pin housing 98. Second ends 108 of pin members 102 of pin structures 80 are interconnected to connection bracket 120 by cables 122. Connection bracket 120 is further connected to first end 126 of a push/pull cable 128. The second end (not shown) of push/pull cable 128 is interconnected to actuator 77.

Figure 1:
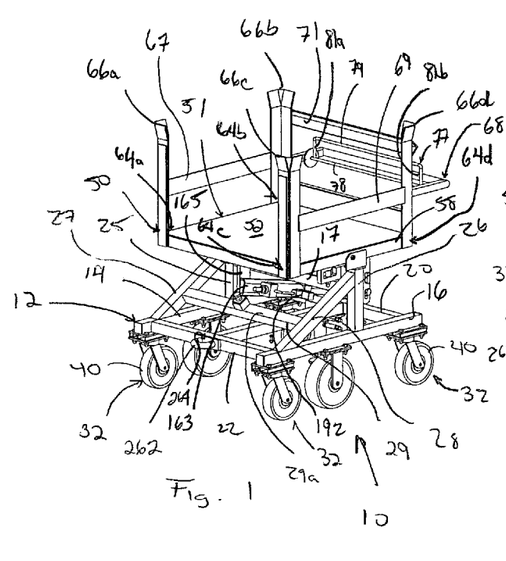
FIG. 1 is an isometric view of a tugger cart in accordance with the present invention having a support platform in a generally horizontal position.
Figure 2:
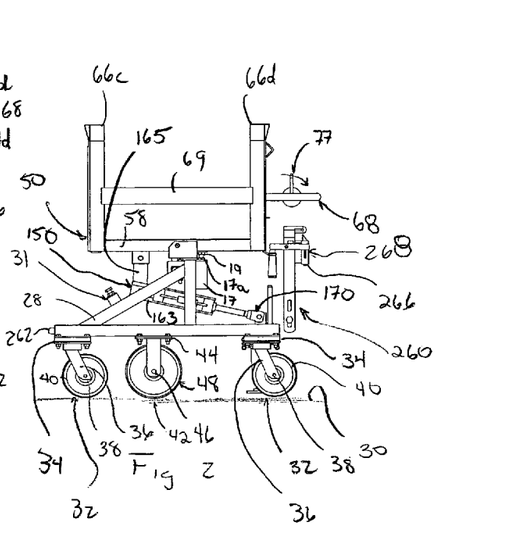
FIG. 2 is a side elevational view of the tugger cart of FIG. 1.
Figure 3:
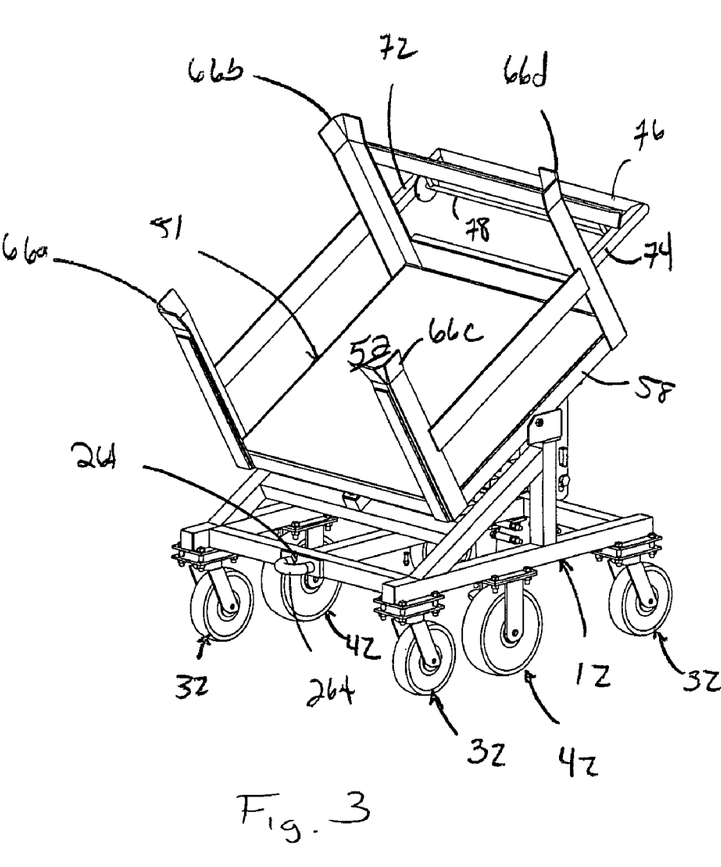
FIG. 3 is an isometric view of the tugger cart in accordance with the present invention having the support platform in a tilted position.
Figure 4:
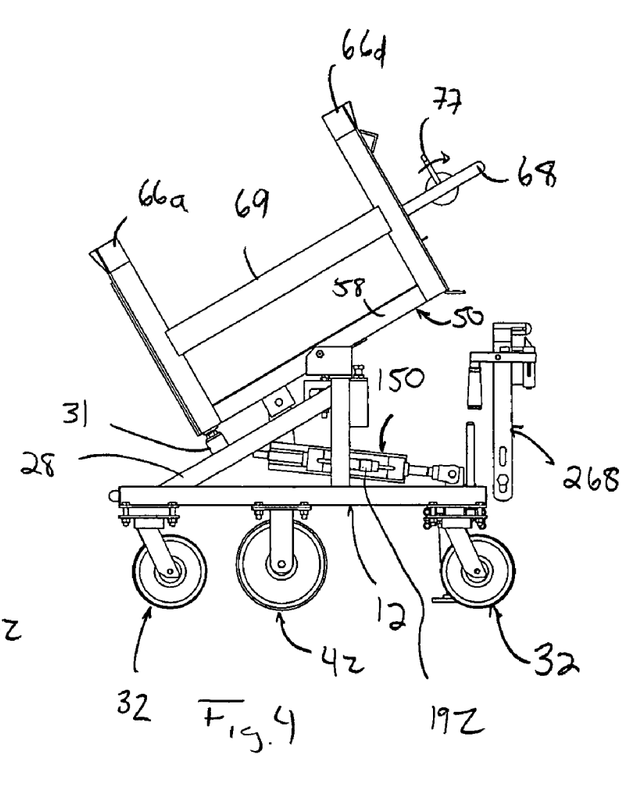
FIG. 4 is a side elevational view of the tugger cart of FIG. 3.

As heretofore described, actuator 77 is movable between a first locking position, FIG. 2, and a second release position. With actuator 77 in the locking position, first ends 103 of pin members 102 of pin structures 80 extend from first ends 106 of pin housings 98 so as to allow first ends 103 of pin members 102 to be received within corresponding reinforced openings 130 and 132 in mounting brackets 33 and 35, respectively. By pivoting actuator 77 to its release position, push-pull cable 128 rotates connection bracket 120 on pivot pin 124 so as to retract pin members 102 along corresponding pin axes within pin housing 98 through cables 122 thereby allowing platform 51 to pivot on corresponding pivot pins 61 and 63 between its horizontal, FIGS. 1-2, and its tilted, FIGS. 3-4, positions.

As best seen in FIG. 2, platform 51 is interconnected to support frame 12 by a cylinder assembly generally designated by the reference numeral 150. Cylinder assembly 150 includes a dampening cylinder 152, FIG. 5, as hereinafter described. Dampening cylinder 152 includes cylinder housing 154 having first and second opposite ends 156 and 158, respectively. Cylinder housing 154 includes an inner surface 160 defining a chamber therein and an outer surface 161. Outer surface 161 of cylinder housing 154 is interconnected to mounting bracket 163 extending therealong. Mount 165 extends from the terminal end of mounting bracket 163 and is pivotably connected to lower surface 54 of platform 51. Ends 156 and 158 of cylinder housing 154 include corresponding openings 162 and 164 therein which are axially aligned with each other. Piston rod 166 extends through openings 162 and 164 in cylinder housing 154. Piston rod 166 includes a first end 168 and a second end 170 pivotably mounted to a mounting flange 169 projecting vertically from intermediate frame member 24.

Figure 5:
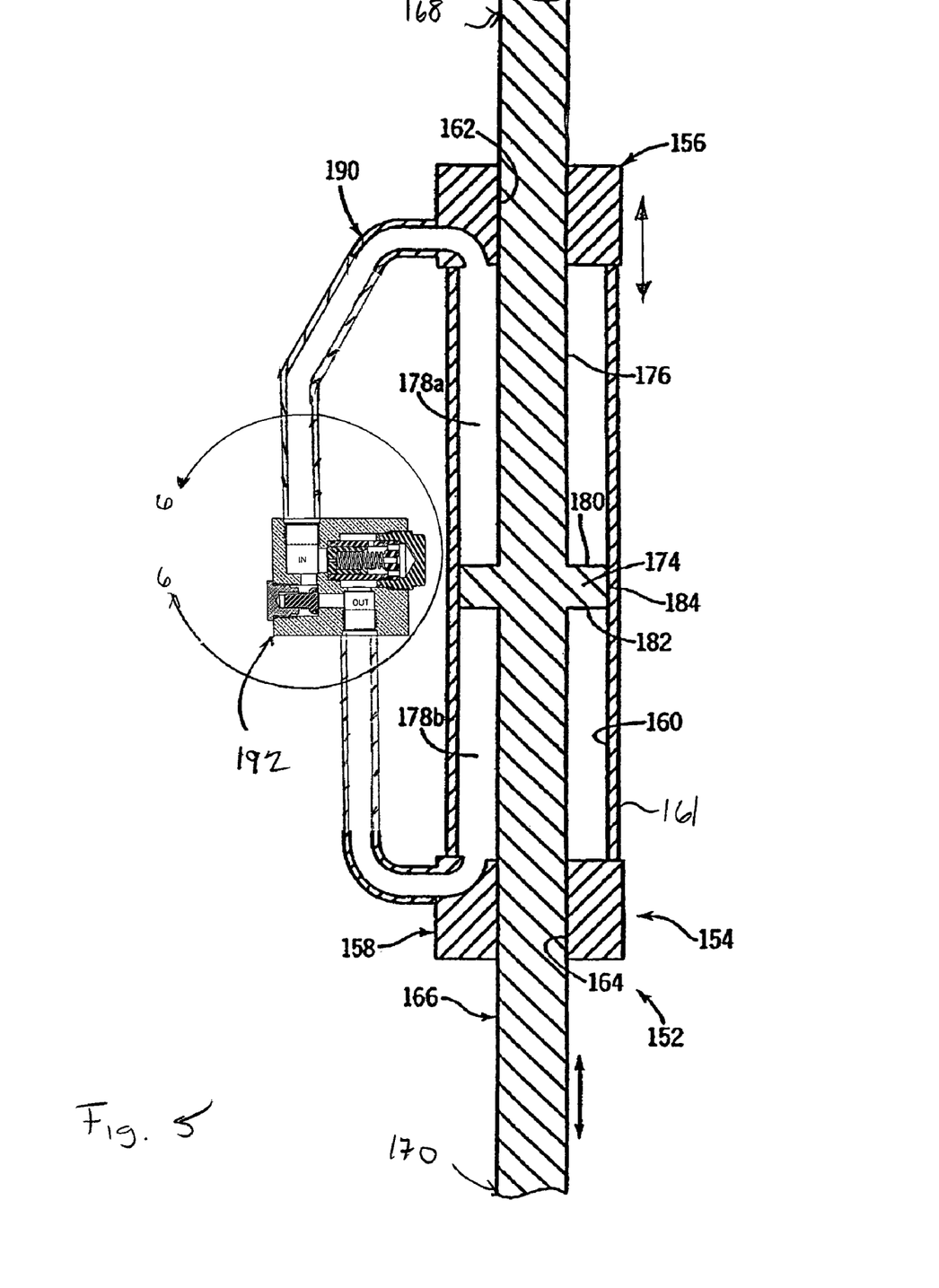
FIG. 5 is a cross-sectional view of the tugger cart of the present invention taken along line 5-5 of FIG. 3.

Piston rod 166 further includes flange 174 projecting radially from the outer surface 176 thereof and disposed within the chamber of cylinder housing 154. Flange 174 divides the chamber within cylinder housing 154 into a first portion 178a and a second portion 178b. Flange 174 is defined by a first surface 180 which is directed towards first portion 178a of the chamber within cylinder housing 154 and a second surface 182 directed towards the second portion 178b of the chamber within cylinder housing 154. First and second surfaces 180 and 182, respectively, of flange 174 are interconnected by a radially outer end surface 184 which forms a slidable interface with the inner surface 160 of cylinder housing 154.

First and second portions 178a and 178b, respectively, of the chamber within cylinder housing 154 are interconnected by a conduit 190. Conduit 190 includes differential pressure valve 192 that controls the flow of fluid between first and second portions 178a and 178b, respectively, of the chamber within cylinder housing 154 Referring to FIG. 6, differential pressure valve 192 includes an input 194 communicating with first portion 178a of the chamber and an output 196 communicating with second portion 178b of the chamber. Check valve 200 is disposed within differential pressure valve 192 and interconnects input 194 and output 196. Check valve 200 allows for fluid exiting second portion 178b of the chamber in cylinder housing 154 to flow therethrough and prevents fluid exiting first portion 178a of chamber in cylinder housing 154 to flow therepast, for reasons hereinafter described.

Figure 6:
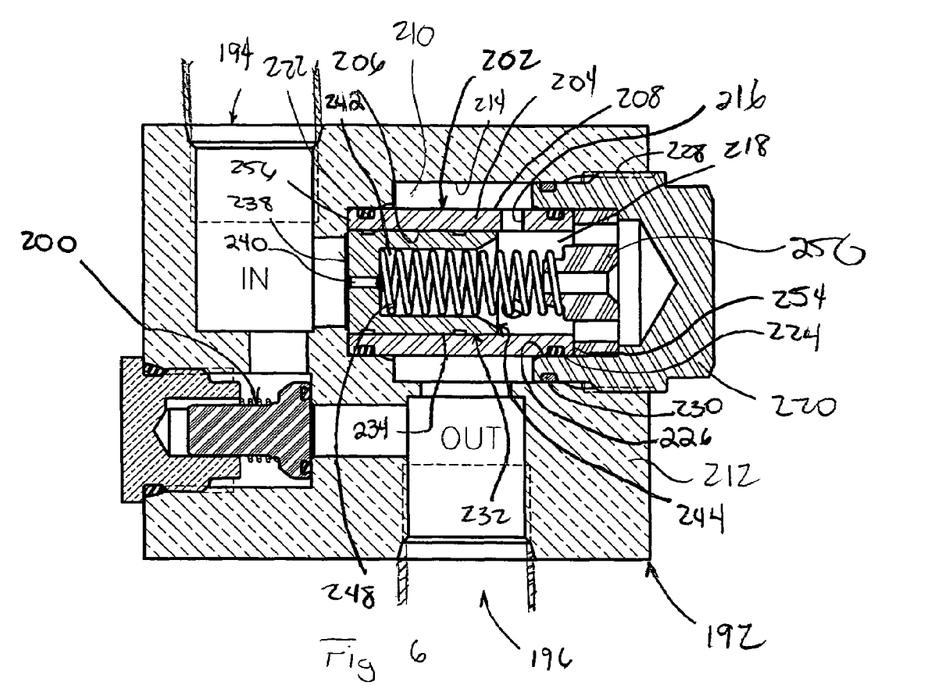
FIG. 6 is an enlarged cross-sectional view of the tugger cart of the present invention taken along line 6-6 of FIG. 5.

Differential pressure valve 192 further includes flow regulator 202. Flow regulator 202 includes generally tubular sleeve 204 having an inner surface 206 defining a cavity therethrough and an outer surface 208. Sleeve 204 is received in cavity 210 formed in body 212 of differential pressure valve 192. Cavity 210 communicates with output 196 of differential pressure valve 192. Cavity 210 is defined by inner surface 214. Sleeve 204 includes aperture 216 therethrough that allows interior 218 of sleeve 204 to communicate with output 196. Cap 220 is seated in and closes cavity 210 so as to maintain sleeve 204 therein. Seal 222 is positioned about outer surface 208 of sleeve 204 and engages inner surface 214 of cavity 210 to prevent the flow of fluid therepast. In addition, seal 224 is positioned about outer surface 208 of sleeve 204 and engages inner surface 226 of cap 220. Seal 230 is position about outer surface 228 of cap 220 to prevent the flow of fluid therepast.

Differential pressure valve 192 further includes impeller 232 received with interior 218 of sleeve 204. Impeller 232 includes an outer surface 234 that forms a slidable interface with inner surface 206 of sleeve 204. Impeller 232 further includes a closed forward end 238 directed towards input 194 of differential pressure valve 192. Port 240 extends through closed end 238 of impeller 232 so as to allow input 194 of differential pressure valve 192 to communicate with cavity 242 formed in open end 244 of impeller 246. Cavity 242 is adapted to receive a first end of spring 248. The second end of spring 248 is seated on fixed base 250 positioned between end 254 of sleeve 204 and cap 220. As described, impeller 232 is movable between an extended position wherein closed end 238 of impeller 232 is substantially flush with end 256 of sleeve 204 and a retracted position wherein closed end 238 of impeller 232 is received within cavity 218 of sleeve 204. Spring 248 biases impeller 232 towards its extended position.

In operation, platform 51 is provided in its horizontal position, FIGS. 1-2, and pin members 102 are received within corresponding reinforced openings 130 and 132. This, in turn, locks platform 51 in the horizontal position. As a result, a load may be deposited on upper surface 52 of platform 51 and transported to a desired location in a factory. In order to provide access to the load, it is contemplated to tilt platform 51 to its tilted position, FIGS. 3-4. In order to tilt platform 51, actuator 77 is pivoted to its release position, such that push-pull cable 128 rotates connection bracket 120 on pivot pin 124 thereby retracting pin members 102 from openings 130 and 132 in mounting brackets 33 and 35, respectively. With pin members 102 removed from openings 130 and 132, platform 51 is free to pivot on corresponding pivot pins 61 and 63 from its horizontal position, FIGS. 1-2, and its tilted position, FIGS. 3-4.

Under the weight of its load, platform 51 is urged towards its tilted position. As platform 51 pivots, cylinder housing 154 is urged axially toward second end 170 of piston rod 166 so as to reduce the size of first portion 178a of the chamber and urge fluid therefrom to input 194 of differential pressure valve 192. The fluid entering input 194 of differential pressure valve 192 exerts a pressure on closed end 238 of impeller 232 dependent on the weight of the load. The fluid flows through port 240 in closed end 238 of impeller 232; cavity 242 in impeller 232; cavity 218 in sleeve 204; aperture 216 through sleeve 204; and out of differential pressure valve 192 though output 196 at a predetermined rate into second portion 178b of the chamber in cylinder housing 154.

If the pressure of the fluid entering input 194 is increased (e.g., by placing a load of greater weight on the upper surface 52 of platform 51), the momentary pressure imbalance causes the impeller 232 to slide into cavity 218 in sleeve 204 against the bias of spring 248 (to the right in FIG. 7). As a result, impeller 232 begins to close a portion of aperture 216 through sleeve 204. As is known, this increases the back pressure on the fluid entering input 194 of differential pressure valve 192, thus causing the flow rate of the fluid flowing through aperture 216 to remain constant.

Similarly, if the pressure of the fluid entering input 194 decreases (e.g., by placing a load of less weight on the upper surface 52 of platform 51), the momentary pressure imbalance cause the impeller 232 to slide into cavity 218 in sleeve 204 with the bias of spring 248 (to the left in FIG. 7). As a result, aperture 216 through sleeve 204 is opened. As is known, this decreases the back pressure on the fluid entering input 194 of differential pressure valve 192, thus causing the flow rate of the fluid flowing through aperture 216 to remain constant. It can be appreciated that the flow rate of the fluid exiting output 196 of differential pressure valve remains constant in response to the variable pressure of the fluid provided at input 194 of differential pressure valve 192. Consequently, no matter what the weight of the load on upper surface 52 of platform 51, platform 51 will pivot from the horizontal position to the tilted position at the same rate. As platform 51 pivots toward its tilted position, platform 51 engages shock absorber 31 and actuator 77 is returned to its locking position.

Once the load is removed from upper surface 52 of platform 51, actuator 77 is returned to its release position. Thereafter, a user utilizes handle 68 to pivot platform 51 towards its horizontal position. As platform 51 is urged towards its horizontal position, cylinder housing 154 is urged axially toward the first end 168 of piston rod 166 so as to reduce the size of second portion 178b of the chamber and urge fluid therefrom to output 196 of differential pressure valve 192. Under the pressure of the fluid entering output 196 of differential pressure valve 192, check valve 200 opens against the bias of spring 258. As a result, fluid flows through input 194 of differential pressure valve 192 and into first portion 178a of the chamber in cylindrical housing 154. As platform 51 pivots toward its horizontal position, platform 51 engages shock absorber 31 and actuator 77 is released to its locking position such that pin members 102 are received within corresponding reinforced openings 130 and 132 in mounting brackets 33 and 35, respectively. Platform 51 is now locked in the horizontal position and the process may be repeated.

It is contemplated for tugger cart 10 to include connection device 260 for interconnecting tugger cart 10 to an adjacent tugger cart 10. Connection device 260 includes a generally U-shaped striker element 262 projecting from trailing frame member 22, FIGS. 1-4. U-shaped striker element 262 defines a passageway 264 therethrough for receiving pin member 266 of a coupling assembly generally designated by the reference numeral 268 of the adjacent tugger cart. Coupling assembly 268 is fully described in now pending U.S. patent application Ser. No. 10/405,396, assigned to the assignee of the present application, and incorporated herein by reference.

Various modes of carrying out the invention are contemplated as being within the scope of the following claims particularly pointing out and distinctly claiming the subject matter that is regarded as the invention.

I claim:

1. A tugger cart for transporting a load having a weight, comprising:

a support frame;

a bed pivotably mounted to the support frame for receiving the load thereon, the bed movable between a first position wherein the bed is lies in a generally horizontal plane and a second position wherein the bed is at a predetermined acute angle to the horizontal plane; and a wheel assembly operatively connected to the support frame for supporting the support frame above a supporting surface;

a cylinder assembly, the cylinder assembly including:

a cylindrical housing having first and second ends and an inner surface defining a cavity in the housing for receiving a fluid therein, the cylinder housing operatively connected one of the bed and the support frame;

a piston slidably extending through the cavity in the housing, the piston having a first end connected to the other of the bed and the support frame and a second end;

a flange projecting from the piston and being positioned within the cavity so as to divide the cavity in the housing into first and second portions, the flange terminating at a radially outer edge that forms a slidable interface with the inner surface of the housing; and a differential pressure valve assembly including:

a differential pressure valve having an upstream input communicating with the first portion of the cavity and a downstream output communicating with the second portion of the cavity, the flow rate of the fluid at the output of the differential pressure valve being constant in response to various pressures of the fluid at the input, the differential pressure valve including:

a flow regulator including a generally tubular sleeve having an inner surface defining a chamber and including an aperture having a size therethrough, the aperture through the sleeve allowing the chamber to communicate with the output of the differential pressure valve; and an impeller slidably received with chamber of the sleeve and having a closed forward end with a port therethrough so as to allow the input of the differential pressure valve to communicate with the chamber, the impeller moveable between a low pressure position and a high pressure position;

a check valve having an input communicating with the output of the differential pressure valve and an output communicating with the input of the differential pressure valve, the check valve controlling the flow of fluid from the second portion to the first portion of the cavity;

wherein the impeller moves from the low pressure position to the high pressure position and selectively restricts the size of the aperture through the sleeve of the flow regulator solely in response to the pressure of the fluid on the closed end of the impeller.

2. The tugger cart of claim 1 further comprising a bed locking structure for locking the bed in the first position.

3. The tugger cart of claim 2 wherein the bed locking structure includes:
a retractable pin operatively connected to one of the bed and the support frame and being movable along a pin axis between an extended position and a retracted position; and
a sleeve connected to the other of the bed and the support frame, the sleeve defining a recess for receiving the pin in the extended position.

4. The tugger cart of claim 3 further comprising an actuator operatively connected to the pin for moving the pin between the extended and retracted positions.

5. A tugger cart for transporting a load, comprising:
a support frame;
a bed pivotably mounted to the support frame for receiving the load thereon, the bed movable at a predetermined rate from a generally horizontal position to a tilted position wherein the bed is at a predetermined angle to horizontal;
a cylinder assembly, the cylinder assembly including:
a cylindrical housing having first and second ends and an inner surface defining a cavity in the housing for receiving a fluid therein, the cylinder housing operatively connected one of the bed and the support frame;
a piston slidably extending through the cavity in the housing, the piston having a first end connected to the other of the bed and the support frame and a second end;
a flange projecting from the piston and being positioned within the cavity so as to divide the cavity in the housing into first and second portions, the flange terminating at a radially outer edge that forms a slidable interface with the inner surface of the housing; and
a differential pressure valve assembly including:
a differential pressure valve having an upstream input communicating with the first portion of the cavity and a downstream output communicating with the second portion of the cavity, the flow rate of the fluid at the output of the differential pressure valve being constant in response to various pressures of the fluid at the input, the differential pressure valve including:
a flow regulator including a generally tubular sleeve having an inner surface defining a chamber and including an aperture having a size therethrough, the aperture through the sleeve allowing the chamber to communicate with the output of the differential pressure valve; and an impeller slidably received with chamber of the sleeve and having a closed forward end with a port therethrough so as to allow the input of the differential pressure valve to communicate with the chamber, the impeller moveable between a low pressure position and a high pressure position;

a check valve having an input communicating with the output of the differential pressure valve and an output communicating with the input of the differential pressure valve, the check valve controlling the flow of fluid from the second portion to the first portion of the cavity, wherein the impeller moves from the low pressure position to the high pressure position and selectively restricts the size of the aperture through the sleeve of the flow regulator solely in response to the pressure of the fluid on the closed end of the impeller.

6. The tugger cart of claim 5 wherein the tugger cart includes:
a wheel assembly operatively connected to the support frame for supporting the support frame above a supporting surface.

7. The tugger cart of claim 5 further comprising a handle assembly extending from the bed.

8. The tugger cart of claim 7 further comprising a locking structure operatively connected to the bed for locking the bed in the horizontal position.

9. The tugger cart of claim 8 wherein the locking structure includes:
a retractable pin operatively connected to the bed and being movable along a pin axis between an extended position wherein the pin is receivable in an opening in the support frame and a retracted position.

10. The tugger cart of claim 9 further comprising an actuator operatively connected to the pin for moving the pin between the extended and retracted positions.

11. A tugger cart for transporting a load, comprising:
a support frame;
a bed pivotably mounted to the support frame for receiving the load thereon, the bed movable between a generally horizontal position and a tilted position wherein the bed is at a predetermined angle to horizontal; and
control structure for controlling the rate at which the bed pivots between the horizontal position and the tilted position, the control structure including:
a cylindrical housing having first and second ends and an inner surface defining a cavity in the housing for receiving a fluid therein, the cylindrical housing operatively connected once of the bed and the support frame;
a piston slidably extending through the cavity in the housing, the piston having a first end connected to the other of the bed and the support frame and a second end;
a flange projecting from the piston and being positioned within the cavity so as to divide the cavity in the housing into first and second portions, the flange terminating at a radially outer edge that forms a slidable interface with the inner surface of the housing; and a differential pressure valve assembly including:

a differential pressure valve having an upstream input communicating with the first portion of the cavity and a downstream output communicating with the second portion of the cavity, the flow rate of the fluid at the output of the differential pressure valve being constant in response to various pressures of the fluid at the input, the differential pressure valve including:

a flow regulator including a generally tubular sleeve having an inner surface defining a chamber and including an aperture having a size therethrough, the aperture through the sleeve allowing the chamber to communicate with the output of the differential pressure valve; and an impeller slidably received with chamber of the sleeve and having a closed forward end with a port therethrough so as to allow the input of the differential pressure valve to communicate with the chamber, the impeller moveable between a low pressure position and a high pressure position;

a check valve having an input communicating with the output of the differential pressure valve and an output communicating with the input of the differential pressure valve, the check valve controlling the flow of fluid from the second portion to the first portion of the cavity;

wherein the impeller moves from the low pressure position to the high pressure position and selectively restricts the size of the aperture through the sleeve of the flow regulator solely in response to the pressure of the fluid on the closed end of the impeller.

12. The tugger cart of claim 11 further comprising a locking structure operatively connected to the bed for locking the bed in the horizontal position.

13. The tugger cart of claim 11 further comprising a connection assembly operatively connected to the support frame for interconnecting the tugger cart to a second tugger cart.

* * * * *